US012687832B2

(12) United States Patent
Zhou et al.

(10) Patent No.: US 12,687,832 B2
(45) Date of Patent: Jul. 21, 2026

(54) OPTIMAL SCHEDULING METHOD FOR PEAK REGULATION OF CASCADE HYDRO-PHOTOVOLTAIC COMPLEMENTARY POWER GENERATION SYSTEM

(71) Applicants: Huaneng Lancang River Hydropower Inc, Kunming (CN); Hohai University, Nanjing (CN); POWERCHINA Guiyang Engineering Corporation Limited, Guiyang (CN); HUANENG GROUP R & D CENTER CO., LTD., Beijing (CN)

(72) Inventors: Jian Zhou, Kunming (CN); Yang Li, Kunming (CN); Dacheng Li, Kunming (CN); Wei Jiang, Kunming (CN); Feng Wu, Kunming (CN); Huawei Xiang, Kunming (CN); Yun Tian, Kunming (CN); Yifan Bao, Kunming (CN); Di Wu, Kunming (CN); Xu Li, Kunming (CN); Linjun Shi, Kunming (CN); Wenbo Huang, Kunming (CN); Xinglin Duan, Kunming (CN); Keman Lin, Kunming (CN); Yanqing Zhang, Kunming (CN)

(73) Assignees: Huaneng Lancang River Hydropower Inc, Kunming (CN); Hohai University, Nanjing (CN); POWERCHINA Guiyang Engineering Corporation Limited, Guiyang (CN); HUANENG GROUP R&D CENTER CO., LTD., Beijing (CN)

( * ) Notice: Subject to any disclaimer, the term of this patent is extended or adjusted under 35 U.S.C. 154(b) by 459 days.

(21) Appl. No.: 18/331,949

(22) Filed: Jun. 9, 2023

(65) Prior Publication Data

US 2023/0367280 A1     Nov. 16, 2023

Related U.S. Application Data

(63) Continuation of application No. PCT/CN2023/086902, filed on Apr. 7, 2023.

(30) Foreign Application Priority Data

May 12, 2022     (CN) ......................... 202210532492.3

(51) Int. Cl.
*G05B 19/042*          (2006.01)

(52) U.S. Cl.
CPC .... *G05B 19/042* (2013.01); *G05B 2219/2639* (2013.01)

(58) Field of Classification Search
None
See application file for complete search history.

(56) References Cited

U.S. PATENT DOCUMENTS 8,964,338 B2 *   2/2015   Wallis ..................... F04C 28/28
                                                       318/434
9,134,717 B2 *   9/2015   Trnka ..................... G05B 17/02
                          (Continued)

OTHER PUBLICATIONS

Bao et al., Short-term Peak-shaving Strategy for Coordinated Cascade Hydro and Photovoltaic System, May 2021, IEEE, 2021 IEEE 4th international electrical and energy conference, pp. 1-6 (Year: 2021).*

(Continued)

*Primary Examiner* — Jason Lin

(57)          ABSTRACT

Disclosed is an optimal scheduling method for peak regulation of a cascade hydro-photovoltaic complementary power generation system. The method includes: establishing (Continued)

an objective function of optimal scheduling for peak regulation of the cascade hydro-photovoltaic complementary power generation system; establishing a photovoltaic power station output constraint condition considering uncertainty; optimizing a mixed integer linear model by performing linear processing on the constraint condition; and obtaining a scheduling solution by solving the mixed integer linear model. According to the present disclosure, a unit commitment of a hydro-power station and an operational solution of a reservoir are considered, so that photovoltaic output can be consumed by fully using a characteristic that the hydro-power unit is easy to regulate, and a demand for peak regulation of a power grid can be satisfied.

3 Claims, 2 Drawing Sheets

(56) References Cited

U.S. PATENT DOCUMENTS

| | | | | |
|---|---|---|---|---|
| 9,477,242 B2 * | 10/2016 | Kovalcik | .................. | F24D 3/02 |
| 9,513,018 B2 * | 12/2016 | Kim | ....................... | F24D 12/02 |
| 9,765,979 B2 * | 9/2017 | Alsaleem | .............. | F24H 15/104 |
| 9,803,902 B2 * | 10/2017 | Pham | ...................... | F25B 45/00 |
| 10,859,324 B2 * | 12/2020 | Wirz | ...................... | F28D 20/028 |
| 11,326,802 B2 * | 5/2022 | Thurlkill | ........... | G05D 23/1917 |
| 2021/0057914 A1 * | 2/2021 | Sun | ......................... | H02J 3/004 |
| 2022/0065486 A1 * | 3/2022 | Thurlkill | .............. | G05B 19/042 |
| 2023/0369863 A1 * | 11/2023 | Kumar | .............. | G06Q 10/0637 |

OTHER PUBLICATIONS

Huang et al., "An optimal operation method for cascade hydro-photovoltaic-pumped storage hybrid generation system", 2019, IEEE PES Innovative Smart Grid Technologies Asia, pp. 4280-4285 (Year: 2019).*

Su et al., "An MILP Model for Short-Term Peak Shaving Operation of Cascaded Hydropower Plants Considering Unit Commitment", IEEE, pp. 1-6 (Year: 2018).*

* cited by examiner

1

OPTIMAL SCHEDULING METHOD FOR PEAK REGULATION OF CASCADE HYDRO-PHOTOVOLTAIC COMPLEMENTARY POWER GENERATION SYSTEM

TECHNICAL FIELD

The present disclosure relates to the technical field of optimal scheduling for a multi-energy complementary power generation system, in particular to an optimal scheduling method for peak regulation of a cascade hydro-photovoltaic complementary power generation system.

BACKGROUND TECHNOLOGY

As renewable clean energy power generation technologies develop by leaps and bounds, installed capacities of photovoltaic power stations increase substantially in recent ten years. As photovoltaic power generation is characterized by strong randomness, intermittency and volatility, it is difficult to match photovoltaic outputs with load demands in a power system. In order to satisfy peak regulation demand of the power system, flexible power supplies need to be introduced to cooperate with the photovoltaic power generation. In addition, hydro-power generating units feature a quick start-stop, a large regulation range, fast regulation, etc., providing sufficient peak regulation capacities for the power system. Therefore, cascade hydro-photovoltaic complementary power generation can make full use of the regulation performance of cascade hydro-power station groups, realizing efficient utilization of renewable energy and safe and stable operation of a grid.

Currently, scholars at home and abroad have performed studies on optimal scheduling of a grid-connected photovoltaic power generation system. Most of them only consider a hydro-power station as a whole, without involving a unit commitment in a cascade hydro-power station. Moreover, synergistic peak regulation of cascade hydro-power units and photovoltaic power stations has not yet been studied deeply.

SUMMARY OF THE DISCLOSURE

An objective of the present disclosure is to provide an optimal scheduling method for peak regulation of a cascade hydro-photovoltaic complementary power generation system, and to provide a unit commitment power generation solution, satisfying a peak regulation demand of the power grid, for the cascade hydro-photovoltaic complementary power generation system.

In order to realize the above objective, the technical solutions employed in the present disclosure are as follows:

The present disclosure provides an optimal scheduling method for peak regulation of a cascade hydro-photovoltaic complementary power generation system, including:

establishing an objective function of optimal scheduling for peak regulation of the cascade hydro-photovoltaic complementary power generation system; and establishing a cascade hydro-power constraint condition considering a unit commitment and a photovoltaic power station output constraint condition considering uncertainty;

performing linear processing on the constraint condition, and establishing a mixed integer linear model of optimal scheduling for peak regulation of the cascade hydro-photovoltaic complementary power generation system on the basis of the objective function and the constraint condition after linear processing; and solving the mixed integer linear model of optimal scheduling for peak regulation of the cascade hydro-photovoltaic complementary power generation system so as to obtain a scheduling solution for the cascade hydro-photovoltaic complementary power generation system.

Further, the establishing an objective function of optimal scheduling for peak regulation of the cascade hydro-photovoltaic complementary power generation system includes:

taking a minimized maximum residual load of a receiving-end grid during a scheduling period as the objective function:

$$\min f = \max\left(P_{load}(t) - \sum_{i=1}^{N_h}\sum_{g=1}^{G_i} P_{i,g}(t) - P_s^e(t)\right), \forall\, t \in T$$

where f is a maximum residual load of the receiving-end grid; $P_{load}(t)$ is a load at moment t; $P_{i,g}(t)$ is active output of a $g_{th}$ generating unit in an $i_{th}$ cascade hydro-power station at the moment t;

$$P_s^e(t)$$

is generating power of a photovoltaic power station at the moment t; T is a total time period of the scheduling period; $N_h$ is the total number of cascade hydro-power stations; and $G_i$ is the number of generating units involved in the $i_{th}$ cascade hydro-power station.

Further, the establishing a cascade hydro-power constraint condition considering a unit commitment and a photovoltaic power station output constraint condition considering uncertainty includes:

establishing a photovoltaic power station output constraint as:

$$P_s^e(t) = \bar{P}_s(t) + \hat{P}_s(t)$$

$$\hat{P}_s^L(t) \le \hat{P}_s(t) \le \hat{P}_s^U(t)$$

where $\bar{P}_s(t)$ is an expected value of the generating power of the photovoltaic power station at the moment t; $\hat{P}_s(t)$ is a power deviation of the photovoltaic power station at the moment t; and $$\hat{P}_s^L(t), \hat{P}_s^U(t)$$

are a lower limit and an upper limit of the power deviation at the moment t, respectively;

establishing the cascade hydro-power constraint considering the unit commitment, which includes:

a hydro-power unit output constraint:

$$P_{i,g}(t) = \eta_{i,g} H_i(t) q_{i,g}(t)$$

$$u_{i,g}(t) P_{i,g}^{min} \le P_{i,g}(t) \le u_{i,g}(t) P_{i,g}^{max}$$

where $\eta_{i,g}$ is a hydro-power conversion coefficient of the gth generating unit in the ith cascade hydro-power station; $H_i(t)$ is a power generation water head of a unit in the ith cascade hydro-power station at the moment t; $q_{i,g}(t)$ is a power generation flow of the gth generating unit in the ith cascade hydro-power station at the moment t;

$$P_{i,g}^{min}$$

and $$P_{i,g}^{max}$$

are a lower limit and an upper limit of the active power output of the gth generating unit in the ith cascade hydro-power station, respectively; and $u_{i,g}(t)$ is an operating state variable of the gth generating unit in the ith cascade hydro-power station, and if the generating unit is activated, $u_{i,g}(t)$ is 1, and otherwise, ui,g(t) is 0;

a hydro-power unit vibration zone limit constraint:

$$\left(P_{i,g}(t) - \bar{P}_{i,g}^{k}\right)\left(P_{i,g}(t) - \underline{P}_{i,g}^{k}\right) \geq 0$$

where $$\bar{P}_{i,g}^{k}$$

and $$\underline{P}_{i,g}^{k}$$

are upper and lower output limits of a kth vibration zone of the gth generating unit in the ith cascade hydro-power station, respectively;

a hydro-power unit climbing ability limit constraint:

$$-\Delta\bar{P}_{i,g} \leq P_{i,g}(t+1) - P_{i,g}(t) \leq \Delta\bar{P}_{i,g}$$

where $\Delta\bar{P}_{i,g}$ is a climbing ability of the gth generating unit in the ith cascade hydro-power station;

a hydro-power unit on/off and minimum on/off duration constraint:

$$y_{i,g}(t) - \tilde{y}_{i,g}(t) = u_{i,g}(t) - u_{i,g}(t-1)$$

$$y_{i,g}(t) - \tilde{y}_{i,g}(t) \leq 1$$

$$y_{i,g}(t) + \sum_{l=t+1}^{max\{t+\alpha_{i,g}-1,T\}} \tilde{y}_{i,g}(l) \leq 1$$

$$\tilde{y}_{i,g}(t) + \sum_{l=t+1}^{max\{t+\beta_{i,g}-1,T\}} y_{i,g}(l) \leq 1$$

$$y_{i,g}(t), \tilde{y}_{i,g}(t) \in \{0, 1\}$$

where $y_{i,g}(t)$ and $\tilde{y}_{i,g}(t)$ are on and off operational variables of the gth generating unit in the ith cascade hydro-power station at the moment t, respectively; and if the generating unit is activated, $y_{i,g}(t)$ is 1, and otherwise, $y_{i,g}(t)$ is 0; if the generating unit is deactivated, $\tilde{y}_{i,g}(t)$ is 1, and otherwise, $\tilde{y}_{i,g}(t)$ is 0; and $\alpha_{i,g}$ and $\beta_{i,g}$ are minimum on duration and minimum off duration of the gth generating unit in the ith cascade hydro-power station, respectively;

a hydro-power unit power generation flow limit constraint:

$$u_{i,g}(t)q_{i,g}^{min} \leq q_{i,g}(t) \leq u_{i,g}(t)q_{i,g}^{max}$$

where $$q_{i,g}^{min}$$

and $$q_{i,g}^{max}$$

are upper and lower limits of the power generation flow of the gth generating unit in the ith cascade hydro-power station, respectively;

an abandoned water flow limit constraint:

$$0 \leq s_i(t) \leq s_i^{max}$$

where $s_i(t)$ is a total abandoned water flow (m3/s) of the ith cascade hydro-power station at the moment t, and $$s_i^{max}$$

is an upper limit of an abandoned water flow of the ith cascade hydro-power station;

a reservoir water level limit constraint:

$$Z_i^{min} \leq Z_i(t) \leq Z_i^{max}$$

where $Z_i(t)$ is a water level of a reservoir corresponding to the ith cascade hydro-power station at the moment t, and $$Z_i^{min}$$

and $$Z_i^{max}$$

are a lower limit and an upper limit of the water level of the reservoir corresponding to the ith cascade hydropower station, respectively, and a dead water level and a normal water level of the reservoir are taken separately;

a cascade water flow balance constraint:

$$V_i(t) =$$

$$V_i(t-1) + \left[ I_i(t) + \sum_g q_{i-1,g}(t - \tau_{i-1}) + s_{i-1}(t - \tau_{i-1}) - \sum_g q_{i,g}(t) - s_i(t) \right] \Delta t$$

Where $V_i(t)$ is a water storage capacity of the reservoir corresponding to the ith cascade hydro-power station at the moment t; $I_i(t)$ is a natural incoming water flow of the ith cascade hydro-power station at the moment t; $\tau_{i-1}$ is a time lag of water flow between an i−1 st cascade hydro-power station and the ith cascade hydro-power station; and $\Delta t$ is a length of a time period in the scheduling period;

a water level-reservoir capacity relationship constraint:

$$Z_i(t) = f(V_i(t))$$

a tail water level-discharge flow relationship constraint:

$$Z_i^d(t) = f\left( \sum_g q_{i,g}(t) + s_i(t) \right)$$

where $$Z_i^d(t)$$

is a tail water level of the reservoir corresponding to the ith cascade hydro-power station at the moment t; and a water head constraint:

$$H_i(t) = \frac{1}{2}[Z_i(t) + Z_i(t-1)] - Z_i^d(t)$$

$$H_i^{min} \le H_i(t) \le H_i^{max}$$

where $$H_i^{min} \text{ and } H_i^{max}$$

are a lower limit and an upper limit of the power generation water head of the generating unit in the ith cascade hydro-power station, respectively.

Further, the performing linear processing on the constraint condition includes:

converting, by using a McCormick convex envelope relaxation method, the hydro-power unit output constraint into the following linear constraints:

$$P_{i,g}(t) \ge \eta_{i,g}\left( q_{i,g}^{min} H_i(t) + H_i^{min} q_{i,g}(t) - q_{i,g}^{min} H_i^{min} \right)$$

$$P_{i,g}(t) \ge \eta_{i,g}\left( q_{i,g}^{max} H_i(t) + H_i^{max} q_{i,g}(t) - q_{i,g}^{max} H_i^{max} \right)$$

-continued $$P_{i,g}(t) \le \eta_{i,g}\left( q_{i,g}^{min} H_i(t) + H_i^{max} q_{i,g}(t) - q_{i,g}^{min} H_i^{max} \right)$$

$$P_{i,g}(t) \le \eta_{i,g}\left( q_{i,g}^{max} H_i(t) + H_i^{min} q_{i,g}(t) - q_{i,g}^{max} H_i^{min} \right)$$

performing linear processing on the unit vibration zone limit constraint as follows:

$$\sum_{k=1}^{K+1} z_{i,g}^k(t) = u_{i,g}(t)$$

$$\sum_{k=1}^{K+1} z_{i,g}^k(t) \underline{P}_{safe,i,g}^k \le P_{i,g}(t) \le \sum_{k=1}^{K+1} z_{i,g}^k(t) \overline{P}_{safe,i,g}^k$$

where K is the number of vibration zones of the gth generating unit in the ith cascade hydro-power station; K+1 is the number of safe operating zones of the gth generating unit in the ith cascade hydro-power station;

$$z_{i,g}^k(t)$$

is an indicator variable, and if output of the gth generating unit in the ith cascade hydro-power station at the moment t is within a kth safe operating zone, $$z_{i,g}^k(t)$$

is 1, and otherwise, $$z_{i,g}^k(t)$$

is 0;

$$\underline{P}_{safe,i,g}^k$$

and $$\overline{P}_{safe,ig}^k$$

are upper and lower limits (MW) of the kth safe operating zone of the gth generating unit in the ith cascade hydro-power station, respectively, and satisfy $$\underline{P}_{safe,ig}^1 = P_{i,g}^{min}, \underline{P}_{safe,ig}^k = \overline{P}_{i,g}^{k+1}, \overline{P}_{safe,i,g}^k = \underline{P}_{i,g}^k \text{ and } \overline{P}_{safe,ig}^{K+1} = P_{i,g}^{max}; \text{ and}$$

performing piecewise linear processing on the water level-reservoir capacity relationship constraint and tail water level-discharge flow relationship constraint separately.

Further, the solving the mixed integer linear model of optimal scheduling for peak regulation of the cascade hydro-photovoltaic complementary power generation system so as to obtain a scheduling solution for the cascade hydro-photovoltaic complementary power generation system includes:

solving the mixed integer linear model of optimal scheduling for peak regulation of the cascade hydro-photovoltaic complementary power generation system by using a CPLEX12.9 solver, so as to obtain the active power output of each generating unit in the cascade hydro-power station at each moment.

The beneficial effects of the present disclosure are as follows:

according to the present disclosure, a unit commitment of a hydro-power station and an operational solution of a reservoir are considered, so that a photovoltaic output can be consumed by fully using a characteristic that the hydro-power unit is easy to regulate, and a demand for peak regulation of a power grid can be satisfied. Therefore, the present disclosure is highly practical.

DESCRIPTION OF ATTACHED DRAWINGS

SPECIFIC EMBODIMENTS

Figure 1:
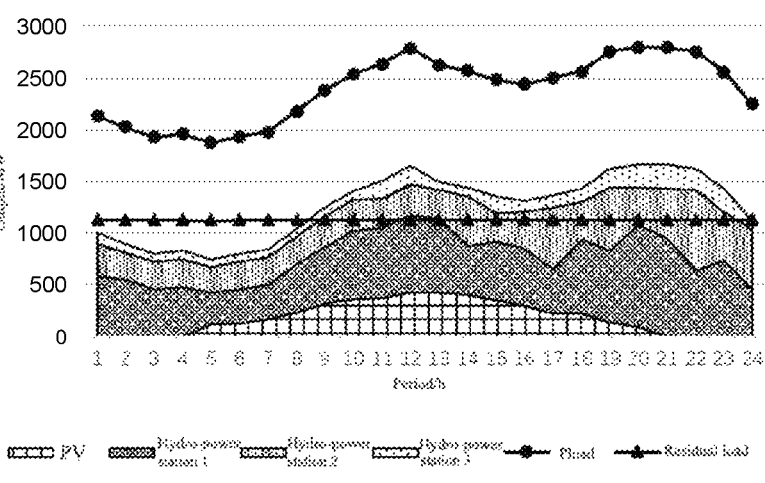
FIG. 1 shows results of optimal scheduling for peak regulation of a cascade hydro-photovoltaic complementary power generation system according to an example of the present disclosure.

The present disclosure is further described below. The following examples are used only to illustrate technical solutions of the present disclosure more clearly and cannot be used to limit the scope of protection of the present disclosure.

The present disclosure provides an optimal scheduling method for peak regulation of a cascade hydro-photovoltaic complementary power generation system. The method includes the following steps:

1) an objective function of optimal scheduling for peak regulation of the cascade hydro-photovoltaic complementary power generation system is established;

2) specific information of a cascade hydro-power station and a photovoltaic power station is acquired, and a cascade hydro-power constraint condition considering a unit commitment and a photovoltaic power station output constraint condition considering uncertainty are established;

3) linear processing is performed on the constraint condition so as to establish a mixed integer linear model of optimal scheduling for peak regulation of the cascade hydro-photovoltaic complementary power generation system; and 4) the mixed integer linear model of optimal scheduling for peak regulation of a cascade hydro-photovoltaic complementary power generation system is solved, so as to obtain a scheduling solution for the cascade hydro-photovoltaic complementary power generation system.

Specifically, the step that an objective function of optimal scheduling for peak regulation of the cascade hydro-photovoltaic complementary power generation system is established includes the following step:

a minimized maximum residual load of a receiving-end grid is taken as the objective function:

$$\min f = \max \left( P_{load}(t) - \sum_{i=1}^{N_h} \sum_{g=1}^{G_i} P_{i,g}(t) - P_s^e(t) \right), \forall\, t \in T$$

where $P_{load}(t)$ is a load (MW) at moment t; $P_{i,g}(t)$ is active power output (MW) of a gth generating unit in an ith cascade hydro-power station at the moment t;

$$P_s^e(t)$$

is generating power (MW) of a photovoltaic power station at the moment t; T is a total time period of a scheduling period; $N_h$ is the total number of cascade hydro-power stations, and $1 \le i \le N_h$; and $G_i$ is the number of generating units involved in the ith cascade hydro-power station, and $1 \le g \le G_i$. Specifically, the step that a cascade hydro-power constraint condition considering a unit commitment and a photovoltaic power station output constraint condition considering uncertainty are established includes the following steps:

a photovoltaic power station output constraint is established as:

$$P_s^e(t) = \bar{P}_s(t) + \hat{P}_s(t)$$

$$\hat{P}_s^L(t) \le \hat{P}_s(t) \le \hat{P}_s^U(t)$$

where $\bar{P}_s(t)$ is an expected value (MW) of the generating power of the photovoltaic power station at the moment t; $\hat{P}_s(t)$ is a power deviation (MW) of the photovoltaic power station at the moment t; $\bar{P}_s(t)$ and $\hat{P}_s(t)$ may be obtained on the basis of historical data; and $$\hat{P}_s^L(t), \hat{P}_s^U(t)$$

are a lower limit and an upper limit (MW) of the power deviation at the moment t, respectively.

a cascade hydro-power constraint considering the unit commitment is established, which includes:

a hydro-power unit output constraint:

$$P_{i,g}(t) = \eta_{i,g} H_i(t) q_{i,g}(t)$$

$$u_{i,g}(t) P_{i,g}^{min} \le P_{i,g}(t) \le u_{i,g}(t) P_{i,g}^{max}$$

where $\eta_{i,g}$ is a hydro-power conversion coefficient of the gth generating unit in the ith cascade hydro-power station; $H_i(t)$ is a power generation water head (m) of a unit in the ith cascade hydro-power station at the moment t; $q_{i,g}(t)$ is a power generation flow (m3/s) of the gth generating unit in the ith cascade hydro-power station at the moment t;

$$P_{i,g}^{min}$$

and $$P_{i,g}^{max}$$

are a lower limit and an upper limit of the active power output of the gth generating unit in the ith cascade hydro-power station respectively; and $u_{i,g}(t)$ is an operating state variable of the gth generating unit in the ith cascade hydro-power station, and if the generating unit is activated, $u_{i,g}(t)$ is 1, and otherwise, $u_{i,g}(t)$ is 0;

a hydro-power unit vibration zone limit constraint:

$$\left(P_{i,g}(t) - \overline{P}_{i,g}^{k}\right)\left(P_{i,g}(t) - \underline{P}_{i,g}^{k}\right) \geq 0$$

where $$\overline{P}_{i,g}^{k}$$

and $$\underline{P}_{i,g}^{k}$$

are upper and lower output limits (MW) of a kth vibration zone of the gth generating unit in the ith cascade hydro-power station, respectively;

a hydro-power unit climbing ability limit constraint:

$$-\Delta\overline{P}_{i,g} \leq P_{i,g}(t+1) - P_{i,g}(t) \leq \Delta\overline{P}_{i,g}$$

where $\Delta\overline{P}_{i,g}$ is a climbing ability (MW/h) of the gth generating unit in the ith cascade hydro-power station;

a hydro-power unit on/off and minimum on/off duration constraint:

$$y_{i,g}(t) - \tilde{y}_{i,g}(t) = u_{i,g}(t) - u_{i,g}(t-1)$$

$$y_{i,g}(t) + \tilde{y}_{i,g}(t) \leq 1$$

$$y_{i,g}(t) + \sum_{l=t+1}^{max\{t+\alpha_{i,g}-1,T\}} \tilde{y}_{i,g}(l) \leq 1$$

$$\tilde{y}_{i,g}(t) + \sum_{l=t+1}^{max\{t+\beta_{i,g}-1,T\}} y_{i,g}(l) \leq 1$$

$$y_{i,g}(t), \tilde{y}_{i,g}(t) \in \{0, 1\}$$

where $y_{i,g}(t)$ and $\tilde{y}_{i,g}(t)$ are on and off operational variables of the gth generating unit in the ith cascade hydro-power station at moment t, respectively, and if the generating unit is activated, $y_{i,g}(t)$ is 1, and otherwise $y_{i,g}(t)$ is 0; if the generating unit is deactivated, $\tilde{y}_{i,g}(t)$ is 1, and otherwise, $\tilde{y}_{i,g}(t)$ is 0; and $\alpha_{i,g}$ and $\beta_{i,g}$ are minimum on duration and minimum off duration of the gth generating unit in the ith cascade hydro-power station, respectively;

a hydro-power unit power generation flow constraint:

$$u_{i,g}(t)q_{i,g}^{min} \leq q_{i,g}(t) \leq u_{i,g}(t)q_{i,g}^{max}$$

where $$q_{i,g}^{min}$$

and $$q_{i,g}^{max}$$

are upper and lower limits (m3/s) of a power generation flow of the gth generating unit in the ith cascade hydro-power station, respectively;

an abandoned water flow constraint:

$$0 \leq s_i(t) \leq s_i^{max}$$

where $s_i(t)$ is a total abandoned water flow (m3/s) of the ith cascade hydro-power station at the moment t, and $$s_i^{max}$$

is the upper limit (m3/s) of an abandoned water flow of the ith cascade hydro-power station;

a reservoir water level constraint:

$$Z_i^{min} \leq Z_i(t) \leq Z_i^{max}$$

where $Z_i(t)$ is a water level (m) of the reservoir corresponding to the ith cascade hydro-power station at the moment t; and $$Z_i^{min}$$

and $$Z_i^{max}$$

are a lower limit and an upper limit of the water level of the reservoir corresponding to the ith cascade hydro-power station, respectively, and a dead water level and a normal water level of the reservoir are taken separately;

a cascade water flow balance constraint:

$$V_i(t) =$$

$$V_i(t-1) + \left[ I_i(t) + \sum_g q_{i-1,g}(t - \tau_{i-1}) + s_{i-1}(t - \tau_{i-1}) - \sum_g q_{i,g}(t) - s_i(t) \right] \Delta t$$

where $V_i(t)$ is a water storage capacity (m3) of the reservoir corresponding to the ith cascade hydro-power station at the moment t; $I_i(t)$ is a natural incoming water flow (m3/s) of the ith cascade hydro-power station at the moment t; $\tau_{i-1}$ is a time-lag (h) of water flow between an i−1st cascade hydro-power station and the ith cascade hydro-power station; and $\Delta t$ is a length (s) of a period in the scheduling period;
a water level-reservoir capacity relationship constraint:

$$Z_i(t) = f(V_i(t))$$

where the function relationship may be obtained approximately by establishing a piecewise linear function according to actual data of the water level-reservoir capacity;
a tail water level-discharge flow relationship constraint:

$$Z_i^d(t) = f\left( \sum_g q_{i,g}(t) + s_i(t) \right)$$

where $$Z_i^d(t)$$

is a tail water level (m) of the reservoir corresponding to the ith cascade hydro-power station at the moment t, and the function relationship is obtained according to the actual data of the reservoir; and
a water head constraint:

$$H_i(t) = \frac{1}{2}[Z_i(t) + Z_i(t-1)] - Z_i^d(t)$$

$$H_i^{min} \le H_i(t) \le H_i^{max}$$

where $$H_i^{min}$$

and $$H_i^{max}$$

are the lower limit and upper limit (m) of the power generation water head of the generating unit in the ith cascade hydro-power station, respectively.
Specifically, the step that linear processing is performed on the constraint condition so as to establish a mixed integer linear model of optimal scheduling for peak regulation of the cascade hydro-photovoltaic complementary power generation system includes the following step:
linear processing is performed on the hydro-power unit output constraint, the unit vibration zone limit constraint, the water level-reservoir capacity relationship constraint and the tail water level-discharge flow relationship constraint separately.

1) The hydro-power unit output constraint is converted, by using a McCormick convex envelope relaxation method, into the following linear constraints:

$$P_{i,g}(t) \ge \eta_{i,g}\left(q_{i,g}^{min}H_i(t) + H_i^{min}q_{i,g}(t) - q_{i,g}^{min}H_i^{min}\right)$$

$$P_{i,g}(t) \ge \eta_{i,g}\left(q_{i,g}^{max}H_i(t) + H_i^{max}q_{i,g}(t) - q_{i,g}^{max}H_i^{max}\right)$$

$$P_{i,g}(t) \le \eta_{i,g}\left(q_{i,g}^{min}H_i(t) + H_i^{max}q_{i,g}(t) - q_{i,g}^{min}H_i^{max}\right)$$

$$P_{i,g}(t) \le \eta_{i,g}\left(q_{i,g}^{max}H_i(t) + H_i^{min}q_{i,g}(t) - q_{i,g}^{max}H_i^{min}\right)$$

2) Linear processing is performed on the unit vibration zone limit constraint as follows:

$$\sum_{k=1}^{K+1} z_{i,g}^k(t) = u_{i,g}(t)$$

$$\sum_{k=1}^{K+1} z_{i,g}^k(t)\underline{P}_{safe,i,g}^k \le P_{i,g}(t) \le \sum_{k=1}^{K+1} z_{i,g}^k(t)\overline{P}_{safe,i,g}^k$$

where K is the number of vibration zones of the gth generating unit in the ith cascade hydro-power station; K+1 is the number of safe operating zones of the gth generating unit in the ith cascade hydro-power station;

$$z_{i,g}^k(t)$$

is an indicator variable; if output of the gth generating unit in the ith cascade hydro-power station at the moment t is within a kth safe operating zone, $$z_{i,g}^k(t)$$

is 1, and otherwise, $$z_{i,g}^k(t)$$

is 0;

$$\underline{P}_{safe,i,g}^k$$

and $$\overline{P}_{safe,i,g}^k$$

are upper and lower limits (MW) of the kth safe operating zone of the gth generating unit in the ith cascade hydro-power station respectively, and satisfy $$\underline{P}^1_{safe,i,g} = P^{min}_{i,g}, \; \underline{P}^1_{safe,i,g} = P^{min}_{i,g}, \; \overline{P}^k_{safe,i,g} = \underline{P}^k_{i,g} \; \text{and} \; \overline{P}^{K+1}_{safe,i,g} = P^{max}_{i,g}.$$

3) Piecewise linear processing is performed on the water level-reservoir capacity relationship constraint and the tail water level-discharge flow relationship constraint. The mixed integer linear model of optimal scheduling for peak regulation of the cascade hydro-photovoltaic complementary power generation system is solved, so as to obtain a scheduling solution for the cascade hydro-photovoltaic complementary power generation system.

Specifically, the mixed integer linear model of optimal scheduling for peak regulation of the cascade hydro-photovoltaic complementary power generation system is solved by using a CPLEX12.9 solver, so as to obtain the scheduling solution for the cascade hydro-photovoltaic complementary power generation system, that is, the active power output $P_{i,g}(t)$ of the generating unit in the cascade hydro-power station at the moment t.

EXAMPLES

Examples of the present disclosure involve a photovoltaic power station and a cascade hydro-power station group consisting of 3 hydro-power stations. Firstly, the objective function of the optimal scheduling for peak regulation of the cascade hydro-photovoltaic complementary power generation system is established as follows:

$$\min f = \max\left( P_{load}(t) - \sum_{i=1}^{N_h}\sum_{g=1}^{G_i} P_{i,g}(t) - P^e_s(t) \right), \; \forall \, t \in T$$

where $P_{load}(t)$ is a load (MW) at moment t; $P_{i,g}(t)$ is active power output (MW) of a gth generating unit in an ith cascade hydro-power station at moment t;

$$P^e_s(t)$$

is generating power (MW) of a photovoltaic power station at the moment t; T is a total time period of a scheduling period; $N_h$ is the total number of cascade hydro-power stations, and $1 \le i \le N_h$; and $G_i$ is the total number of generating units contained in the ith cascade hydro-power station, and $1 \le g \le G_i$. The values of $P_{load}(t)$ are shown in Table 1:

TABLE 1

| Time period | 1 | 2 | 3 | 4 | 5 | 6 | 7 | 8 | 9 | 10 | 11 | 12 |
|---|---|---|---|---|---|---|---|---|---|---|---|---|
| $P_{load}(t)$ (MW) | 2,134 | 2,026 | 1,932 | 1,960 | 1,879 | 1,933 | 1,979 | 2,180 | 2,381 | 2,538 | 2,639 | 2,788 |
| Time period | 13 | 14 | 15 | 16 | 17 | 18 | 19 | 20 | 21 | 22 | 23 | 24 |
| $P_{load}(t)$ (MW) | 2,627 | 2,568 | 2,482 | 2,444 | 2,500 | 2,564 | 2,757 | 2,798 | 2,793 | 2,756 | 2,562 | 2,252 |

Then, the specific information of the cascade hydro-power station and photovoltaic power station is acquired, and the constraint condition of optimal scheduling for peak regulation of the cascade hydro-photovoltaic complementary power generation system is established as follows:

1) A photovoltaic power station output constraint is established:

$$P^e_s(t) = \overline{P}_s(t) + \hat{P}_s(t)$$

$$\hat{P}^s_L(t) \le \hat{P}_s(t) \le \hat{P}^U_s(t)$$

where $\overline{P}_s(t)$ is an expected value (MW) of the generating power of the photovoltaic power station at the moment t; $\hat{P}_s(t)$ is a power deviation (MW) of the photovoltaic power station at the moment t; and $$\hat{P}^s_L(t), \; \hat{P}^U_s$$

are the lower limit and upper limit (MW) of the power deviation at the moment t, respectively.

Photovoltaic Output Parameters are Shown in Table 2:

TABLE 2

| | Photovoltaic output | | |
|---|---|---|---|
| Time period | $\overline{P}_s(t)$ (MW) | $\hat{P}^L_s(t)$ (MW) | $\hat{P}^U_s(t)$ (MW) |
| 1 | 0 | 0 | 0 |
| 2 | 0 | 0 | 0 |
| 3 | 0 | 0 | 0 |
| 4 | 0 | 0 | 0 |
| 5 | 120 | −79.8 | 56.7 |
| 6 | 130 | −87.5 | 51.1 |
| 7 | 170 | −95.2 | 51.1 |
| 8 | 240 | −75.6 | 34.3 |
| 9 | 320 | −85.4 | 28 |
| 10 | 370 | −119.7 | 19.6 |
| 11 | 380 | −109.9 | 22.4 |
| 12 | 430 | −135.8 | 14 |
| 13 | 430 | −141.4 | 14 |
| 14 | 410 | −135.8 | 15.4 |
| 15 | 360 | −107.8 | 35.7 |
| 16 | 300 | −86.1 | 45.5 |
| 17 | 230 | −81.9 | 53.2 |

TABLE 2-continued

| Photovoltaic output | | | |
|---|---|---|---|
| Time period | $\bar{P}_s(t)$ (MW) | $\hat{P}_s^L(t)$ (MW) | $\hat{P}_s^U(t)$ (MW) |
| 18 | 230 | −89.6 | 40.6 |
| 19 | 140 | −83.3 | 37.1 |
| 20 | 100 | −67.9 | 60.2 |
| 21 | 0 | 0 | 0 |
| 22 | 0 | 0 | 0 |
| 23 | 0 | 0 | 0 |
| 24 | 0 | 0 | 0 |

2) A hydro-power unit output constraint is established:

$$P_{i,g}(t) = \eta_{i,g} H_i(t) q_{i,g}(t)$$

$$u_{i,g}(t) P_{i,g}^{min} \le P_{i,g}(t) \le u_{i,g}(t) P_{i,g}^{max}$$

where $\eta_{i,g}$ is a hydro-power conversion coefficient of the $g_{th}$ generating unit in the $i_{th}$ cascade hydro-power station; $H_i(t)$ is a power generation water head (m) of a unit in the $i_{th}$ cascade hydro-power station at the moment t; $q_{i,g}(t)$ is a power generation flow (m³/s) of the $g_{th}$ generating unit in the $i_{th}$ cascade hydro-power station at the moment t;

$$P_{i,g}^{min}$$

and $$P_{i,g}^{max}$$

are a lower limit and an upper limit of the active power output of the $g_{th}$ generating unit in the $i_{th}$ cascade hydro-power station, respectively; and $u_{i,g}(t)$ is an operating state variable of the $g_{th}$ generating unit in the $i_{th}$ cascade hydro-power station, and if the generating unit is activated, $u_{i,g}(t)$ is 1, and otherwise, $u_{i,g}(t)$ is 0.

Relevant Parameters of the Cascade Hydro-Power Station are Shown in Table 3:

TABLE 3

| Relevant parameters of the cascade hydro-power station | | | | | | | |
|---|---|---|---|---|---|---|---|
| Hydro-power station number | Installed capacity(MW) | Maximum water head (m) | Minimum water head (m) | Unit vibration zone (MW) | Single unit maximum generation flow (m³/s) | Minimum on/off duration (h) | Dead water level (m) | Normal water level (m) |
| 1 | 4*460 | 203 | 145 | 0~80, 150~300 | 257 | 2 | 350 | 400 |
| 2 | 4*300 | 121.5 | 80.7 | 80~180 | 328 | 2 | 180 | 200 |
| 3 | 3*90 | 40 | 22.3 | 0~20 | 291 | 2 | 78 | 80 |

3) A hydro-power unit vibration zone limit constraint is established:

$$\left(P_{i,g}(t) - \bar{P}_{i,g}^k\right)\left(P_{i,g}(t) - \underline{P}_{i,g}^k\right) \ge 0$$

where $$\bar{P}_{i,g}^k$$

and $$\underline{P}_{i,g}^k$$

are upper and lower output limits (MW) of a $k_{th}$ vibration zone of the $g_{th}$ generating unit in the $i_{th}$ cascade hydro-power station, respectively.

4) A hydro-power unit climbing ability limit constraint is established:

$$-\Delta \bar{P}_{i,g} \le P_{i,g}(t+1) - P_{i,g}(t) \le \Delta \bar{P}_{i,g}$$

where $-\Delta \bar{P}_{i,g}$ is a climbing ability (MW/h) of the $g_{th}$ generating unit in the $i_{th}$ cascade hydro-power station.

5) A hydro-power unit on/off and minimum on/off duration constraint is established is established:

$$y_{i,g}(t) - \tilde{y}_{i,g}(t) = u_{i,g}(t) - u_{i,g}(t-1)$$

$$y_{i,g}(t) + \tilde{y}_{i,g}(t) \le 1$$

$$y_{i,g}(t) + \sum_{l=t+1}^{max\{t+\alpha_{i,g}-1,T\}} \tilde{y}_{i,g}(l) \le 1$$

$$\tilde{y}_{i,g}(t) + \sum_{l=t+1}^{max\{t+\beta_{i,g}-1,T\}} y_{i,g}(l) \le 1$$

$$y_{i,g}(t), \tilde{y}_{i,g}(t) \in \{0, 1\}$$

where $y_{i,g}(t)$ and $y_{i,g}(t)$ are on and off operational variables of the $g_{th}$ generating unit in the $i_{th}$ cascade hydro-power station at the moment t, respectively, and if the generating unit is activated, $y_{i,g}(t)$ is 1, and otherwise, $y_{i,g}(t)$ is 0; if the generating unit is deactivated, $\tilde{y}_{i,g}(t)$ is 1, and otherwise, $\tilde{y}_{i,g}(t)$ is 0; and $\alpha_{i,g}$ and $\beta_{i,g}$ are minimum on duration and minimum off duration of the $g_{th}$ generating unit in the $i_{th}$ cascade hydro-power station, respectively.

6) A hydro-power unit power generation flow limit constraint is established:

$$u_{i,g}(t)q_{i,g}^{min} \le q_{i,g}(t) \le u_{i,g}(t)q_{i,g}^{max}$$

where $$q_{i,g}^{min}$$

and $$q_{i,g}^{max}$$

are upper and lower limits (m³/s) of the power generation flow of the $g_{th}$ generating unit in the $i_{th}$ cascade hydro-power station, respectively.

7) An abandoned water flow constraint is established:

$$0 \le s_i(t) \le s_i^{max}$$

where $s_i(t)$ is a total abandoned water flow (m³/s) of the $i_{th}$ cascade hydro-power station at the moment t; and $$s_i^{max}$$

is the upper limit (m³/s) of the abandoned water flow of the $i_{th}$ cascade hydro-power station.

8) A reservoir water level constraint is established:

$$Z_i^{min} \le Z_i(t) \le Z_i^{max}$$

where $Z_i(t)$ is a water level (m) of the reservoir corresponding to the $i_{th}$ cascade hydro-power station at the moment t; and $$Z_i^{min}$$

and $$Z_i^{max}$$

are a lower limit and an upper limit of the water level of the reservoir corresponding to the $i_{th}$ cascade hydro-power station respectively, and a dead water level and a normal water level of the reservoir are taken separately.

9) A cascade water flow balance constraint is established:

$$V_i(t) = V_i(t-1) + \left[ I_i(t) + \sum_g q_{i-1,g}(t - \tau_{i-1}) + s_{i-1}(t - \tau_{i-1}) - \sum_g q_{i,g}(t) - s_i(t) \right] \Delta t$$

where $V_i(t)$ is a water storage capacity (m³) of the reservoir corresponding to the $i_{th}$ cascade hydro-power station at the moment t; $I_i(t)$ is a natural incoming water flow (m³/s) of the $i_{th}$ cascade hydro-power station at the moment t; $\tau_{i-1}$ is a time-lag (h) of a water flow between an $i-1_{st}$ cascade hydro-power station and the $i_{th}$ cascade hydro-power station; and $\Delta t$ is a length (s) of a period in the scheduling period.

10) A water level-reservoir capacity relationship constraint is established:

$$Z_i(t) = f(V_i(t))$$

11) A tail water level-discharge flow relationship constraint is established:

$$Z_i^d(t) = f\left( \sum_g q_{i,g}(t) + s_i(t) \right)$$

where $$Z_i^d(t)$$

is a tail water level (m) of the reservoir corresponding to the $i_{th}$ cascade hydro-power station at the moment t.

12) A water head constraint is established:

$$H_i(t) = \frac{1}{2}[Z_i(t) + Z_i(t-1)] - Z_i^d(t)$$

$$H_i^{min} \le H_i(t) \le H_i^{max}$$

where $$H_i^{min}$$

and $$H_i^{max}$$

are a lower limit and an upper limit (m) of the power generation water head of the generating unit in the ith cascade hydro-power station, respectively.

Then, linear processing is performed on the constraint, and a mixed integer linear model of optimal scheduling for peak regulation of the cascade hydro-photovoltaic complementary power generation system is established as follows:

1) the hydro-power unit output constraint is converted, by using a McCormick convex envelope relaxation method, into the following linear constraints:

$$P_{i,g}(t) \geq \eta_{i,g}\left(q_{i,g}^{min}H_i(t) + H_i^{min}q_{i,g}(t) - q_{i,g}^{min}H_i^{min}\right)$$

$$P_{i,g}(t) \geq \eta_{i,g}\left(q_{i,g}^{max}H_i(t) + H_i^{max}q_{i,g}(t) - q_{i,g}^{max}H_i^{max}\right)$$

$$P_{i,g}(t) \leq \eta_{i,g}\left(q_{i,g}^{min}H_i(t) + H_i^{max}q_{i,g}(t) - q_{i,g}^{min}H_i^{max}\right)$$

$$P_{i,g}(t) \leq \eta_{i,g}\left(q_{i,g}^{max}H_i(t) + H_i^{min}q_{i,g}(t) - q_{i,g}^{max}H_i^{min}\right)$$

2) Linear processing is performed on the unit vibration zone limit constraint as follows:

$$\sum_{k=1}^{K+1} z_{i,g}^k(t) = u_{i,g}(t)$$

$$\sum_{k=1}^{K+1} z_{i,g}^k(t)\underline{P}_{safe,i,g}^k \leq P_{i,g}(t) \leq \sum_{k=1}^{K+1} z_{i,g}^k(t)\overline{P}_{safe,i,g}^k$$

where K is the number of vibration zones of the $g_{th}$ generating unit in the $i_{th}$ cascade hydro-power station; K+1 is the number of safe operating zones of the $g_{th}$ generating unit in the $i_{th}$ cascade hydro-power station;

$$z_{i,g}^k(t)$$

is an indicator variable; if the output of the $g_{th}$ generating unit in the $i_{th}$ cascade hydro-power station at the moment t is within a $k_{th}$ safe operating zone, $$z_{i,g}^k(t)$$

is 1, and otherwise, $$z_{i,g}^k(t)$$

is 0;

$$\underline{P}_{safe,i,g}^k$$

and $$\overline{P}_{safe,i,g}^k$$

are upper and lower limits (MW) of the $k_{th}$ safe operating zone of the $g_{th}$ generating unit in the cascade hydro-power station respectively, and satisfy $$\underline{P}_{safe,i,g}^1 = P_{i,g}^{min}, \underline{P}_{safe,i,g}^k = \overline{P}_{i,g}^{k+1}, \overline{P}_{safe,i,g}^k = \underline{P}_{i,g}^k \text{ and } \overline{P}_{safe,i,g}^{K+1} = P_{i,g}^{max}.$$

Figure 2:
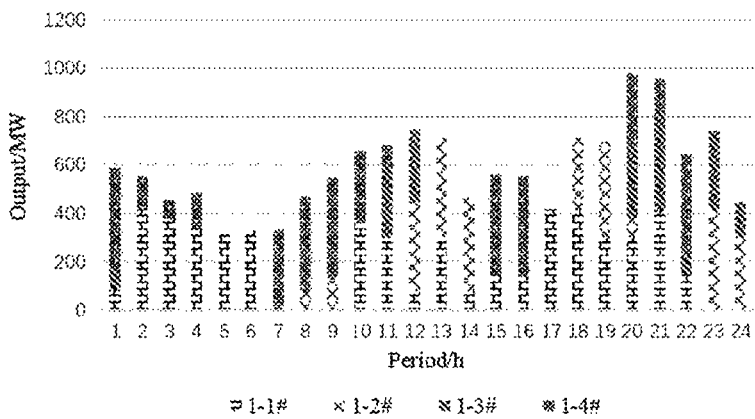
FIG. 2 shows results of a unit commitment of a No. 1 hydro-power station in a cascade hydro-power station group according to an example of the present disclosure.
Figure 3:
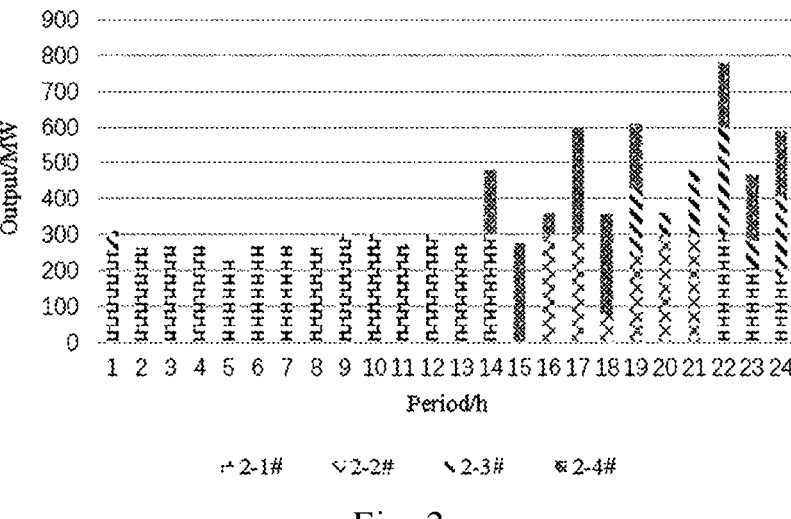
FIG. 3 shows results of a unit commitment of a No. 2 hydro-power station in a cascade hydro-power station group according to an example of the present disclosure.
Figure 4:
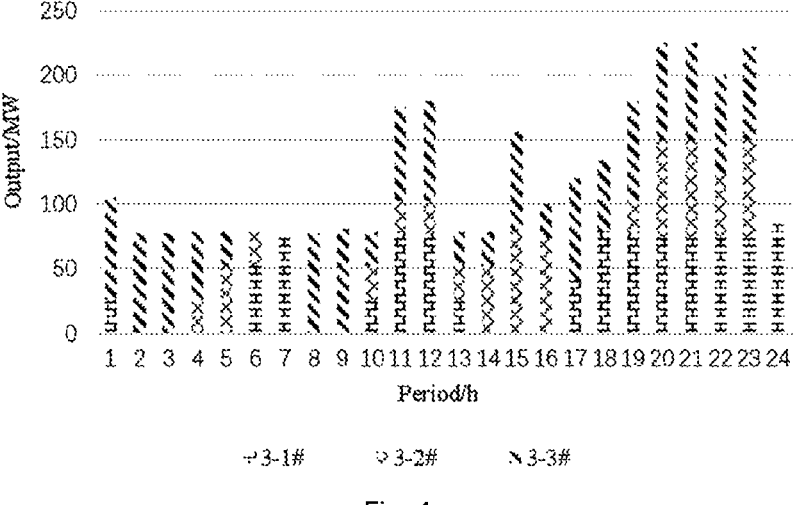
FIG. 4 shows results of a unit commitment of a No. 3 hydro-power station in a cascade hydro-power station group according to an example of the present disclosure.

3) Piecewise linear processing is performed on the water level-reservoir capacity relationship constraint and the tail water level-discharge flow relationship constraint. Finally, the mixed integer linear model of optimal scheduling for peak regulation of the cascade hydro-photovoltaic complementary power generation system is solved by using a CPLEX12.9 solver, so as to obtain a scheduling solution for the cascade hydro-photovoltaic complementary power generation system, as shown in FIG. 1 and Table 4. FIG. 2, FIG. 3 and FIG. 4 show output results of each unit of a No. 1 hydro-power station, a No. 2 hydro-power station and a No. 3 hydro-power station in a cascade hydro-power station group, respectively.

TABLE 4

| Scheduling solution of a unit commitment of a cascade hydro-photovoltaic complementary power generation system | | | | | | | | | | |
|---|---|---|---|---|---|---|---|---|---|---|
| | Output of each unit of hydro-power station 1 (MW) | | | | Output of each unit of hydro-power station 2 (MW) | | | | Output of each unit of hydro-power station 3 (MW) | | |
| Moment | 1-1# | 1-2# | 1-3# | 1-4# | 2-1# | 2-2# | 2-3# | 2-4# | 3-1# | 3-2# | 3-3# |
| 1 | 80 | 0 | 93 | 415 | 249 | 0 | 60 | 0 | 26 | 0 | 79 |
| 2 | 416 | 0 | 0 | 138 | 264 | 0 | 0 | 0 | 0 | 0 | 77 |
| 3 | 378 | 0 | 0 | 80 | 265 | 0 | 0 | 0 | 0 | 0 | 77 |
| 4 | 336 | 0 | 0 | 150 | 266 | 0 | 0 | 0 | 0 | 26 | 52 |
| 5 | 310 | 0 | 0 | 0 | 242 | 0 | 0 | 0 | 0 | 52 | 26 |
| 6 | 328 | 0 | 0 | 0 | 266 | 0 | 0 | 0 | 52 | 26 | 0 |
| 7 | 0 | 0 | 0 | 335 | 265 | 0 | 0 | 0 | 77 | 0 | 0 |
| 8 | 0 | 80 | 0 | 388 | 264 | 0 | 0 | 0 | 0 | 0 | 77 |
| 9 | 0 | 132 | 0 | 416 | 300 | 0 | 0 | 0 | 0 | 0 | 81 |
| 10 | 359 | 0 | 0 | 300 | 300 | 0 | 0 | 0 | 26 | 26 | 26 |
| 11 | 300 | 0 | 302 | 80 | 271 | 0 | 0 | 0 | 77 | 26 | 72 |
| 12 | 80 | 368 | 300 | 0 | 300 | 0 | 0 | 0 | 77 | 26 | 77 |
| 13 | 300 | 412 | 0 | 0 | 276 | 0 | 0 | 0 | 26 | 26 | 26 |
| 14 | 80 | 390 | 0 | 0 | 300 | 0 | 0 | 180 | 0 | 52 | 26 |
| 15 | 146 | 0 | 0 | 416 | 0 | 0 | 0 | 274 | 0 | 78 | 78 |
| 16 | 136 | 0 | 0 | 416 | 0 | 300 | 0 | 60 | 0 | 74 | 26 |
| 17 | 419 | 0 | 0 | 0 | 0 | 300 | 0 | 300 | 41 | 0 | 79 |
| 18 | 412 | 300 | 0 | 0 | 0 | 80 | 0 | 277 | 79 | 0 | 55 |
| 19 | 300 | 398 | 0 | 0 | 0 | 248 | 180 | 180 | 77 | 26 | 77 |
| 20 | 301 | 80 | 300 | 300 | 0 | 300 | 60 | 0 | 75 | 75 | 75 |
| 21 | 408 | 0 | 408 | 140 | 0 | 300 | 180 | 0 | 75 | 75 | 75 |

TABLE 4-continued

| | Scheduling solution of a unit commitment of a cascade hydro-photovoltaic complementary power generation system | | | | | | | | | |
| | Output of each unit of hydro-power station 1 (MW) | | | | Output of each unit of hydro-power station 2 (MW) | | | | Output of each unit of hydro-power station 3 (MW) | | |
| Moment | 1-1# | 1-2# | 1-3# | 1-4# | 2-1# | 2-2# | 2-3# | 2-4# | 3-1# | 3-2# | 3-3# |
|---|---|---|---|---|---|---|---|---|---|---|---|
| 22 | 150 | 0 | 80 | 414 | 300 | 0 | 300 | 181 | 76 | 48 | 76 |
| 23 | 0 | 411 | 332 | 0 | 206 | 0 | 80 | 180 | 75 | 75 | 72 |
| 24 | 0 | 300 | 150 | 0 | 180 | 0 | 228 | 180 | 84 | 0 | 0 |

Those skilled in the art should understand that the examples of the present application can be provided as methods, systems or computer program products. Accordingly, the present application can be in the form of entirely hardware examples, entirely software examples, or examples of a combination of software and hardware. Further, the present application can be in the form of computer program products implemented on one or more computer-usable storage media (including, but not limited to, a disk memory, a compact disk read-only memory (CD-ROM), an optical memory, etc.) including computer-usable program codes.

The present application is described with reference to flow charts and/or block diagrams of methods, devices (systems) and computer program products according to the examples of the present application. It should be understood that each flow and/or block in the flow chart and/or block diagram and combinations of the flow and/or block in the flow chart and/or block diagram, can be implemented by computer program instructions. These computer program instructions can be provided for a processor of a general-purpose computer, a special-purpose computer, an embedded processor, or other programmable data processing devices, so as to generate a machine, so that instructions executed by the processor of computers or other programmable data processing devices generate an apparatus for performing a function specified in one or more flows of a flow chart and/or one or more blocks of a block diagram. These computer program instructions can also be stored in a computer-readable memory capable of directing computers or other programmable data processing devices to operate in a particular manner, so that instructions stored in the computer-readable memory produce a manufactured product including a command apparatus that implements the function specified in one or more flows of a flow chart and/or one or more blocks of a block diagram.

These computer program instructions can also be loaded into computers or other programmable data processing devices, so that a series of operational steps are executed on the computer or other programmable devices, so as to produce computer-implemented processing, so that instructions executed on the computer or other programmable devices provide steps for implementing the function specified in one or more flows of a flow chart and/or one or more blocks of a block diagram.

Finally, it should be noted that the examples described above are only used to illustrate technical solutions of the present disclosure, and not to limit the present disclosure. Although the present disclosure is described in detail with reference to the above examples, those ordinary skilled in the art should understand that specific embodiments of the present disclosure can still be modified or replaced equivalently. These modifications or equivalent replacements, within the spirit and scope of the present disclosure, should fall within the scope of protection of the claims of the present disclosure.

What is claimed is:

1. An optimization scheduling method for a peak regulation of a cascade hydro-PV complementary power generation system, comprising:

establishing an objective function of optimization scheduling for the peak regulation of the cascade hydro-PV complementary power generation system; and establishing a cascade hydro-power constraint condition considering a unit commitment and the PV power station output constraint condition considering uncertainty;

performing linear processing on the constraint condition, and constructing a mixed integer linear model of optimization scheduling for the peak regulation of the cascade hydro-PV complementary power generation system based on the objective function and a linearized constraint condition; and solving the mixed integer linear model of optimization scheduling for the peak regulation of the cascade hydro-PV complementary power generation system so as to obtain a scheduling scheme for the cascade hydro-PV complementary power generation system;

controlling operation of the cascade hydro-PV complementary power generation system based on the scheduling scheme;

wherein the establishing an objective function of optimal scheduling for peak regulation of the cascade hydro-photovoltaic complementary power generation system comprises:

taking a minimized maximum residual load of a receiving-end grid during a scheduling period as the objective function:

$$\min f = \max\left( P_{load}(t) - \sum_{i=1}^{N_h} \sum_{g=1}^{G_i} P_{i,g}(t) - P_s^e(t) \right), \forall\, t \in T$$

wherein f is a maximum residual load of the receiving-end grid; $P_{load}(t)$ is a load at moment t; $P_{i,g}(t)$ is active output of a $g_{th}$ generating unit in an $i_{th}$ cascade hydro-power station at the moment $$t; P_s^e(t)$$

is generating power of the photovoltaic power station at the moment t; T is a total time period of the scheduling period; $N_h$ is the total number of cascade hydro-power stations; and $G_i$ is the number of generating units involved in the $i_{th}$ cascade hydro-power station;

the establishing a cascade hydro-power constraint condition considering a unit commitment and a photovoltaic power station output constraint condition considering uncertainty comprises:

establishing a photovoltaic power station output constraint as:

$$P_s^e(t) = \overline{P}_s(t) + \hat{P}_s(t)$$

$$\hat{P}_s^L(t) \leq \hat{P}_s(t) \leq P_s^U(t)$$

wherein $\underline{P}_s(t)$ is an expected value of the generating power of the photovoltaic power station at the moment t; $\hat{P}_s(t)$ is a power deviation of the photovoltaic power station at the moment t; and $$\hat{P}_s^L(t), \hat{P}_s^U(t)$$

are a lower limit and an upper limit of the power deviation at the moment t, respectively; and establishing a cascade hydro-power constraint considering the unit commitment, which comprises:

a hydro-power unit output constraint:

$$P_{i,g}(t) = \eta_{i,g} H_i(t) q_{i,g}(t)$$

$$u_{i,g}(t) P_{i,g}^{min} \leq P_{i,g}(t) \leq u_{i,g}(t) P_{i,g}^{max}$$

wherein $\eta_{i,g}$ is a hydro-power conversion coefficient of the $g_{th}$ generating unit in the $i_{th}$ cascade hydro-power station; $H_i(t)$ is a power generation water head of a unit in the $i_{th}$ cascade hydro-power station at the moment t; $q_{i,g}(t)$ is a power generation flow of the $g_{th}$ generating unit in the $i_{th}$ cascade hydro-power station at the moment $$t; P_{i,g}^{min}$$

and $$P_{i,g}^{max}$$

are a lower limit and an upper limit of active power output of the $g_{th}$ generating unit in the $i_{th}$ cascade hydro-power station, respectively; and $u_{i,g}$ is an operating state variable of the $g_{th}$ generating unit in the $i_{th}$ cascade hydro-power station, wherein if the generating unit is activated, $u_{i,g}(t)$ is 1, and otherwise, $u_{i,g}(t)$ is 0;

a hydro-power unit vibration zone limit constraint:

$$\left(P_{i,g}(t) - \overline{P}_{i,g}^k\right)\left(P_{i,g}(t) - \underline{P}_{i,g}^r\right) \geq 0$$

wherein $$\overline{P}_{i,g}^k$$

and $$\underline{P}_{i,g}^k$$

are upper and lower output limits of a $k_{th}$ vibration zone of the $g_{th}$ generating unit in the $i_{th}$ cascade hydro-power station, respectively;

a hydro-power unit climbing ability limit constraint:

$$-\Delta \overline{P}_{i,g} \leq P_{i,g}(t+1) - P_{i,g}(t) \leq \Delta \overline{P}_{i,g}$$

wherein $\Delta \underline{P}_{i,g}$ is a climbing ability of the $g_{th}$ generating unit in the $i_{th}$ cascade hydro-power station;

a hydro-power unit on/off and minimum on/off duration constraint:

$$y_{i,g}(t) - \tilde{y}_{i,g}(t) = u_{i,g}(t) - u_{i,g}(t-1)$$

$$y_{i,g}(t) + \tilde{y}_{i,g}(t) \leq 1$$

$$y_{i,g}(t) + \sum_{i=t+1}^{max\{t+\alpha_{i,g}-1,T\}} \tilde{y}_{i,g}(l) \leq 1$$

$$\tilde{y}_{i,g}(t) + \sum_{i=t+1}^{max\{t+\beta_{i,g}-1,T\}} y_{i,g}(l) \leq 1$$

$$y_{i,g}(t), \tilde{y}_{i,g}(t) \in \{0, 1\}$$

wherein $y_{i,g}(t)$ and $\tilde{y}_{i,g}(t)$ are on and off operational variables of the $g_{th}$ generating unit in the $i_{th}$ cascade hydro-power station at the moment t, respectively, wherein if the generating unit is activated, $y_{i,g}(t)$ is 1, and otherwise, $y_{i,g}(t)$ is 0; if the generating unit is deactivated, $\tilde{y}_{i,g}(t)$ is 1, and otherwise, $\tilde{y}_{i,g}(t)$ is 0; and $\alpha_{i,g}$ and $\beta_{i,g}$ are minimum on duration and minimum off duration of the $g_{th}$ generating unit in the $i_{th}$ cascade hydro-power station, respectively;

a hydro-power unit power generation flow limit constraint:

$$u_{i,g}(t) q_{i,g}^{min} \leq q_{i,g}(t) \leq u_{i,g}(t) q_{i,g}^{max}$$

wherein $$q_{i,g}^{min}$$

and $$q_{i,g}^{max}$$

are upper and lower limits of the power generation flow of the $g_{th}$ generating unit in the $i_{th}$ cascade hydro-power station, respectively;

an abandoned water flow limit constraint:

$$0 \leq s_i(t) \leq s_i^{max}$$

wherein $s_i(t)$ is a total abandoned water flow (m3/s) of the $i_{th}$ cascade hydro-power station at the moment t, and $$s_i^{max}$$

is the upper limit of an abandoned water flow of the $i_{th}$ cascade hydro-power station;

a reservoir water level limit constraint:

$$Z_i^{min} \leq Z_i(t) \leq Z_i^{max}$$

wherein $Z_i(t)$ is a water level of a reservoir corresponding to the $i_{th}$ cascade hydro-power station at the moment $$t; Z_i^{min}$$

and $$Z_i^{max}$$

are a lower limit and an upper limit of the water level of the reservoir corresponding to the $i_{th}$ cascade hydro-power station, respectively, and a dead water level and a normal water level of the reservoir are taken separately;

a cascade water flow balance constraint:

$$V_i(t) =$$

$$V_i(t-1) + \left[ I_i(t) + \sum_g q_{i-1,g}(t-\tau_{i-1}) + s_{i-1}(t-\tau_{i-1}) - \sum_g q_{i,g}(t) - s_i(t) \right] \Delta t$$

wherein $V_i(t)$ is a water storage capacity of the reservoir corresponding to the $i_{th}$ cascade hydro-power station at the moment t; $I_i(t)$ is a natural incoming water flow of the $i_{th}$ cascade hydro-power station at the moment t; $\tau_{i-1}$ is a time lag of water flow between an i–1st cascade hydro-power station and the $i_{th}$ cascade hydro-power station; and $\Delta t$ is a length of a time period in the scheduling period;

a water level-reservoir capacity relationship constraint:

$$Z_i(t) = f(V_i(t))$$

a tail water level-discharge flow relationship constraint:

$$Z_i^d(t) = f\left( \sum_g q_{i,g}(t) + s_i(t) \right)$$

wherein $$Z_i^d(t)$$

is a tail water level of the reservoir corresponding to the $i_{th}$ cascade hydro-power station at the moment t; and a water head constraint:

$$H_i(t) = \frac{1}{2}[Z_i(t) + Z_i(t-1)] - Z_i^d(t)$$

$$H_i^{min} \leq H_i(t) \leq H_i^{max}$$

wherein $$H_i^{min} \text{ and } H_i^{max}$$

are a lower limit and an upper limit of the power generation water head of the generating unit in the $i_{th}$ cascade hydro-power station, respectively.

2. The optimization scheduling method for a peak regulation of a cascade hydro-PV complementary power generation system according to claim 1, wherein the performing linear processing on the constraint condition, comprising:

converting the hydro-power unit output constraint, by using a McCormick convex envelope relaxation method, into the following linear constraint:

$$P_{i,g}(t) \geq \eta_{i,g}\left( q_{i,g}^{min} H_i(t) + H_i^{min} q_{i,g}(t) - q_{i,g}^{min} H_i^{min} \right)$$

$$P_{i,g}(t) \geq \eta_{i,g}\left( q_{i,g}^{max} H_i(t) + H_i^{max} q_{i,g}(t) - q_{i,g}^{max} H_i^{max} \right)$$

$$P_{i,g}(t) \leq \eta_{i,g}\left( q_{i,g}^{min} H_i(t) + H_i^{max} q_{i,g}(t) - q_{i,g}^{min} H_i^{max} \right)$$

$$P_{i,g}(t) \leq \eta_{i,g}\left( q_{i,g}^{max} H_i(t) + H_i^{min} q_{i,g}(t) - q_{i,g}^{max} H_i^{min} \right)$$

performing linear processing on the unit vibration zone limit constraint:

$$\sum_{k=1}^{K+1} z_{i,g}^k(t) = u_{i,g}(t)$$

$$\sum_{k=1}^{K+1} z_{i,g}^k(t) \underline{P}_{safe,i,g}^k \leq P_{i,g}(t) \leq \sum_{k=1}^{K+1} z_{i,g}^k(t) \overline{P}_{safe,i,g}^k$$

wherein, K is the number of vibration zones of the $g_{th}$ generating unit in the $i_{th}$ cascade hydro-power station; K+1 is the number of safe operating zones of the $g_{th}$ generating unit in the $i_{th}$ cascade hydro-power station;

$$z_{i,g}^k(t)$$

is an indicator variable, and $$z_{i,g}^k(t)$$

is 1 if the output, is within a $k_{th}$ safe operating zone at moment t, of the $g_{th}$ generating unit in the $i_{th}$ cascade hydro-power station, and 0 otherwise;

$$\underline{P}_{safe,i,g}^k, \overline{P}_{safe,i,g}^k$$

are upper and lower limits of the $k_{th}$ safe operating zone of the $g_{th}$ generating unit in the $i_{th}$ cascade hydro-power station, respectively, and meet $$\underline{P}_{safe,i,g}^1 = P_{i,g}^{min}, \underline{P}_{safe,i,g}^k = \overline{P}_{i,g}^{k+1}, \overline{P}_{safe,i,g}^k = \underline{P}_{i,g}^k, \overline{P}_{safe,i,g}^{K+1} = P_{i,g}^{max};$$

and performing piecewise linear processing on the water level-reservoir capacity relationship constraint and tail water level-discharge flow relationship constraints respectively.

3. The optimization scheduling method for a peak regulation of a cascade hydro-PV complementary power generation system according to claim 2, wherein the solving the mixed integer linear model of optimization scheduling for the peak regulation of the cascade hydro-PV complementary power generation system so as to obtain a scheduling scheme for the cascade hydro-PV complementary power generation system, comprising:

solving the mixed integer linear model of optimization scheduling for the peak regulation of the cascade hydro-PV complementary power generation system by using a CPLEX12.9 solver, so as to obtain the active power output of each generating unit in the cascade hydro-power station at each moment.

* * * * *